Figure 14:
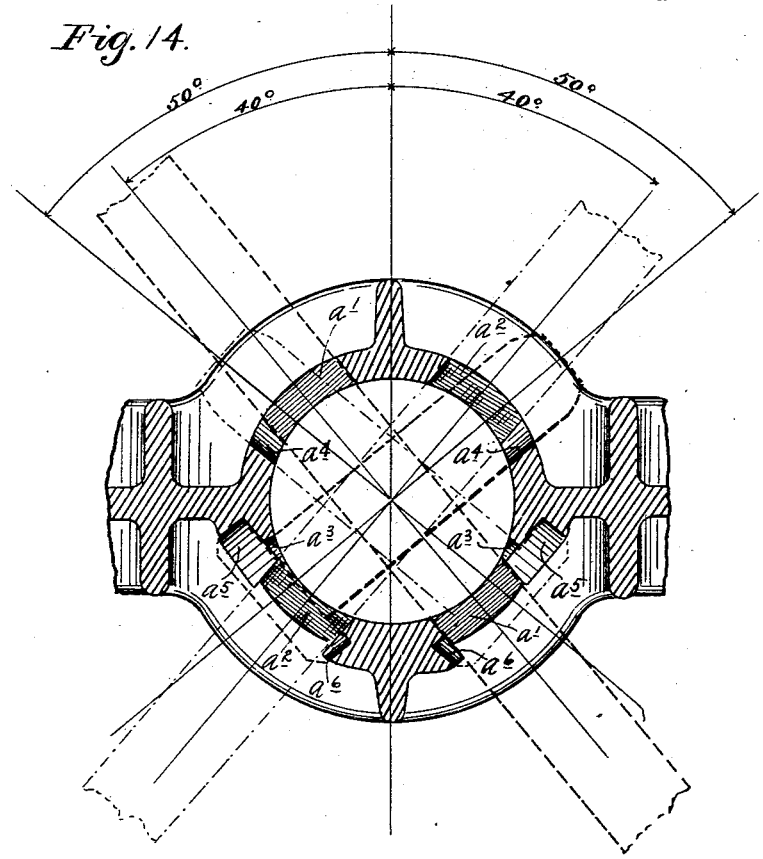

(No Model.) 4 Sheets—Sheet 1.
H. H. VAUGHAN.
LEVER SUPPORT FOR INTERCHANGEABLE BRAKE BEAMS.
No. 590,248. Patented Sept. 21, 1897.
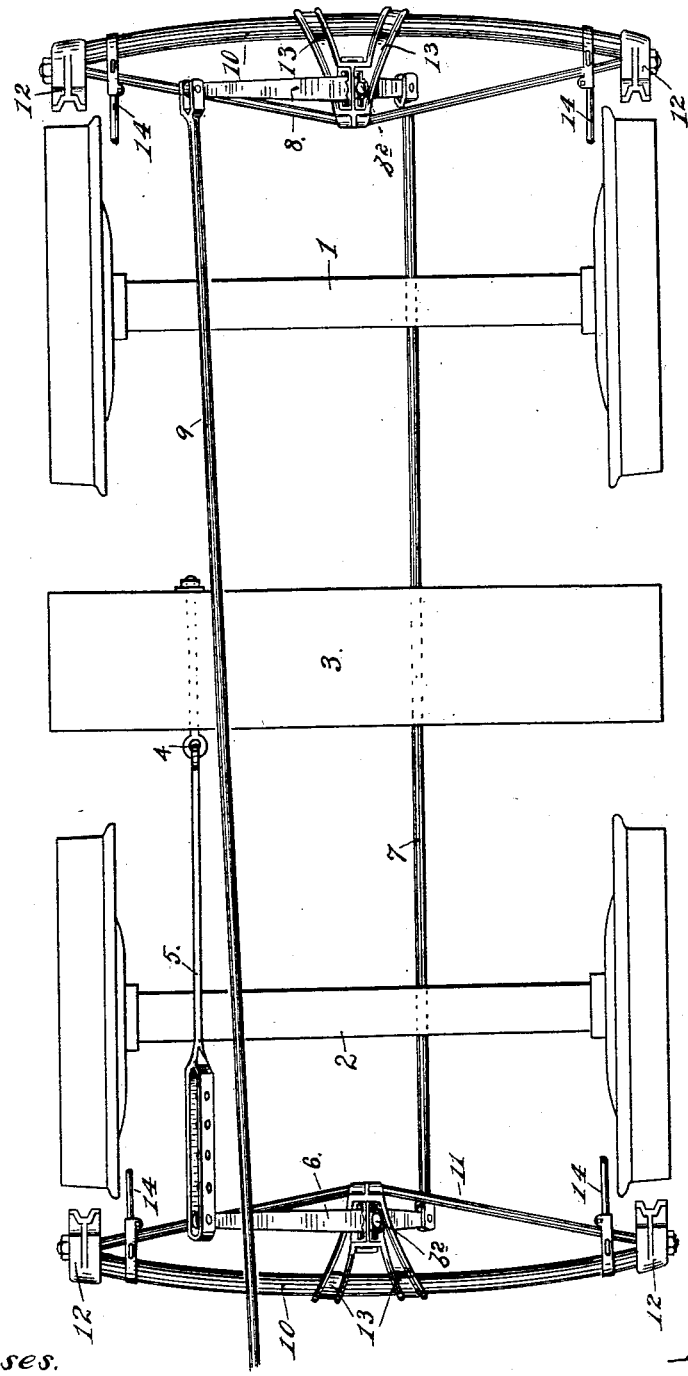
Witnesses.
C. F. Kilgore
G. F. Merchant
Inventor.
Henry H. Vaughan.
By his Attorney
Jas. F. Williamson (No Model.) 4 Sheets—Sheet 2.
H. H. VAUGHAN.
LEVER SUPPORT FOR INTERCHANGEABLE BRAKE BEAMS.
No. 590,248. Patented Sept. 21, 1897.
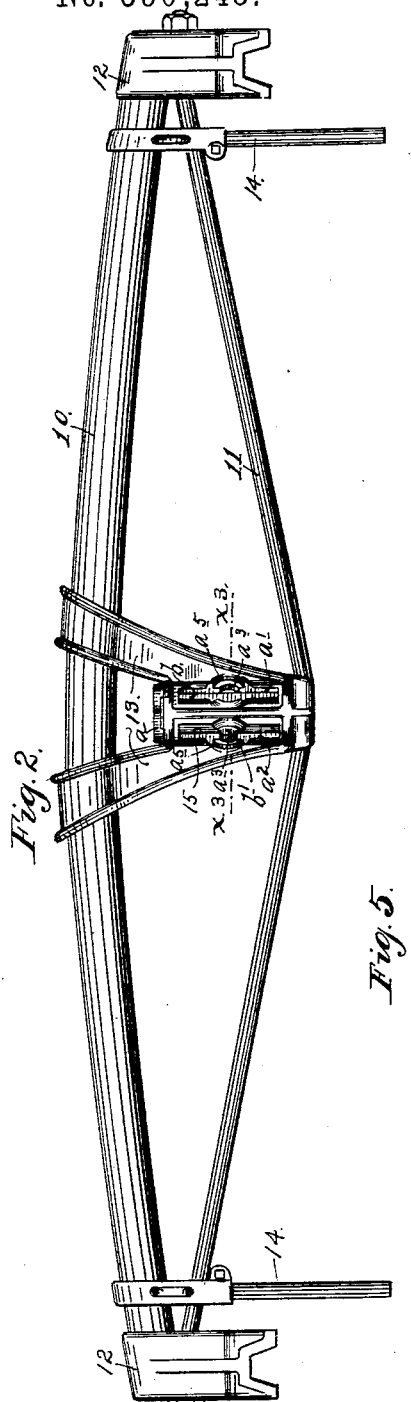
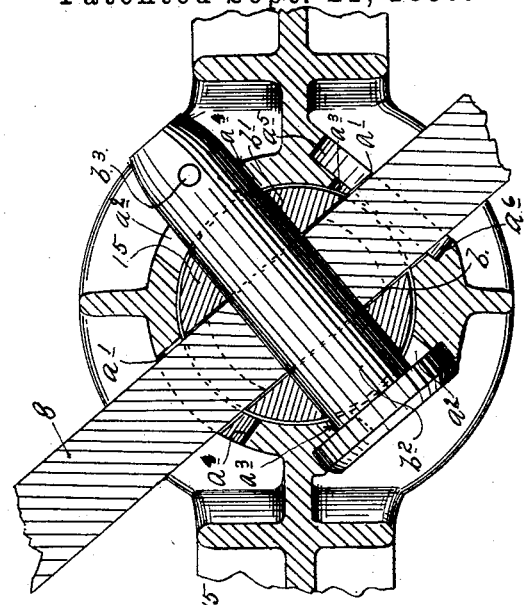
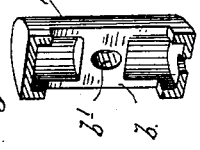
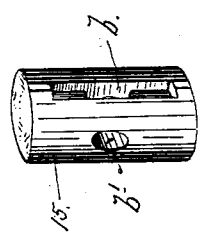
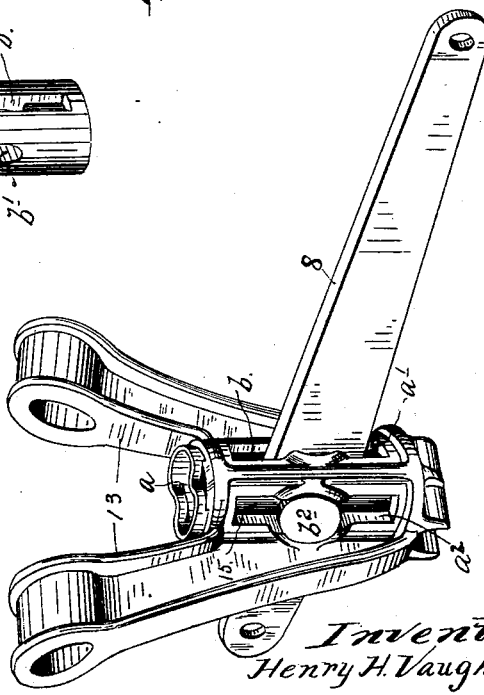
Witnesses.
C. F. Kilgin
R. D. Merchant
Inventor
Henry H. Vaughan
By his Attorney
Jas. F. Williams
THE NORRIS PETERS CO., PHOTO-LITHO., WASHINGTON, D. C.

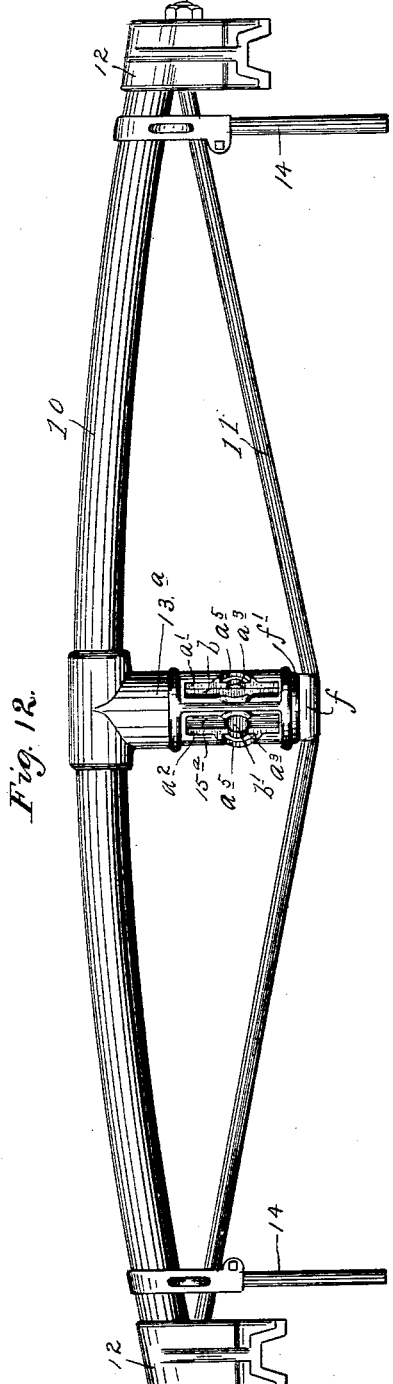

(No Model.) 4 Sheets—Sheet 4.

H. H. VAUGHAN.
LEVER SUPPORT FOR INTERCHANGEABLE BRAKE BEAMS.

No. 590,248. Patented Sept. 21, 1897.

Witnesses
C. F. Kilgore
A. D. Merchant

Inventor
Henry H. Vaughan.
By his Attorney
Jas. F. Williamson

THE NORRIS PETERS CO., PHOTO-LITHO., WASHINGTON, D. C.

United States Patent Office.

HENRY H. VAUGHAN, OF ST. PAUL, MINNESOTA, ASSIGNOR OF ONE-HALF TO GEORGE FULLER, OF SAME PLACE.

LEVER-SUPPORT FOR INTERCHANGEABLE BRAKE-BEAMS.

SPECIFICATION forming part of Letters Patent No. 590,248, dated September 21, 1897.

Application filed November 11, 1896. Serial No. 611,757. (No model.)

*To all whom it may concern:*

Be it known that I, HENRY H. VAUGHAN, a citizen of the United States, residing at St. Paul, in the county of Ramsey and State of Minnesota, have invented certain new and useful Improvements in Lever-Supports for Interchangeable Brake-Beams and other Uses; and I do hereby declare the following to be a full, clear, and exact description of the invention, such as will enable others skilled in the art to which it appertains to make and use the same.

My invention has for its object to provide an improved lever-support for application to interchangeable brake-beams and other uses.

The invention is especially designed for use in connection with interchangeable brake-beams, but the same is capable of general application wherever the corresponding functions peculiar to the lever-support may be required.

To this end my invention consists of the novel devices and combinations of devices which will be hereinafter described, and defined in the claims.

In the drawings I have illustrated my improved lever-support as designed for brake-beams.

In said drawings like notations refer to like parts throughout the several views.

Figure 15:
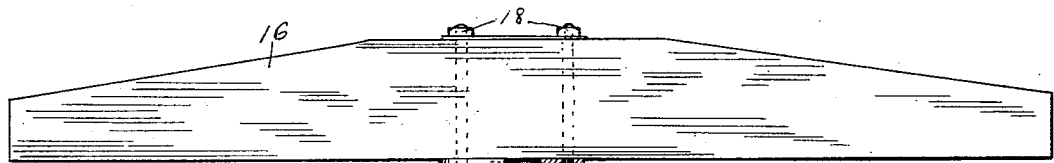
Figure 16:
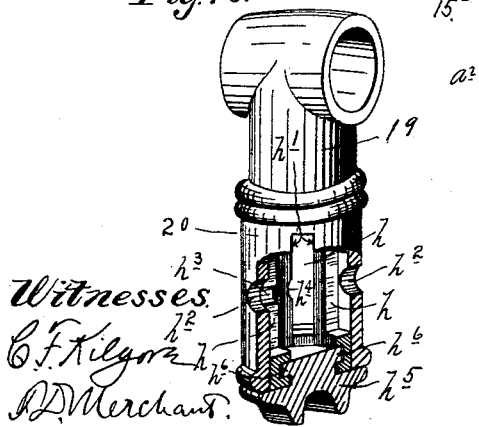
Figure 17:
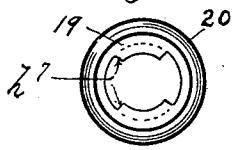

Figure 1 is a view in plan showing a part of a car-truck and brake-rigging as equipped with brake-beams containing my improved lever-support, with some parts removed and others broken away. Fig. 2 is a plan view of one of the brake-beams shown in Fig. 1 detached. Fig. 3 is a cross section on the line $x^3$ $x^3$ of Fig. 2, with the addition of some diagram-lines to show angular relations. Fig. 4 is a detail in perspective showing the lever-support illustrated in Figs. 1 and 2 detached from the beam. Fig. 5 is a detail in perspective showing the form of the fulcrum-block which is employed for coöperation with the form of lever-holder illustrated in the views so far named. Fig. 6 is a sectional perspective of the fulcrum-block shown in Fig. 5, the section being taken longitudinally of the block through the lever-passage therein. Fig. 7 is a sectional perspective of the parts shown in Fig. 4 as they would appear in the line of the lever, with the section taken through the holder or strut and the fulcrum-block in the plane of the pin. Fig. 8 is a sectional perspective of a slightly-modified form of lever-holder wherein a different construction is used for holding the fulcrum-block within the holder. Fig. 9 is a perspective view of the form of fulcrum-block which is used for coöperation with the holder shown in Fig. 8. Fig. 10 is a view, partly in outer end elevation and partly in section, of the parts shown in Figs. 8 and 9 as they would appear related when the block was being entered into its seat in the holder. Fig. 11 is a view similar to Fig. 10, but showing the same parts as they would appear after the fulcrum-block had been entered into its seat in the holder and turned into its working position. Fig. 12 is a plan view of a brake-beam, showing a modification wherein a single strut instead of a double or divided strut is employed as the lever-holder. Fig. 13 is a sectional perspective of the lever-support shown in Fig. 12 detached. Fig. 14 is a diagram view with the worked-up or full-line parts on the same section-line as shown in Fig. 3 for illustrating the angular relations of the different parts and the bearing-surfaces provided for the fulcrum-pin. Fig. 15 is a view in plan illustrating a modified form of the lever-support as the same might be constructed for application to an ordinary wooden beam. Fig. 16 is a sectional perspective, with some parts in full, showing a further modification of the lever-support or strut, which is in the nature of the reverse of some of the forms shown in the other views; and Fig. 17 is an inner end view of the parts shown in Fig. 16, with the saddle removed.

Referring to Fig. 1 of the drawings, the numeral 1 represents the outer pair of car-wheels and 2 the inner pair of car-wheels of the truck shown.

The numeral 3 represents one of the transoms or cross-pieces of the truck-frame.

The other parts of the truck are not shown.

Having regard to the brake-rigging, which is shown as of the well-known "Hodge" construction, the numeral 4 represents an eye-bolt securing the fulcrum-rod 5 to the transom or cross-piece 3. 6 represents the deadlever; 7, the bottom rod; 8, the live-lever, and 9 the top rod, extending to the floating or so-called "Hodge" lever (not shown) or other suitable part through which the brakes are operated. The brake-rigging might, of course, be of any other suitable kind.

Having regard to the brake-beam in the forms illustrated from Figs. 1 to 14, inclusive, the numeral 10 represents the beam-body; 11, the truss-rod; 12, the brake-heads, and 13 and $13^a$ represent, respectively, the double or divided strut and the single strut as modified according to my invention for serving as the holder or fixed member of my lever-support.

The numeral 14 in Figs. 1, 2, and 12 represents the so-called "guide-pins" carried by the brake-beam.

The divided or double strut 13 has its body portion formed integral with its divided portions or arms and is applied in the usual way in respect to the beam-body 10 and the truss-rod 11; but instead of being of the ordinary construction the body portion of said double or divided strut 13 is cored out from its outer end inward to a point near the saddle, so as to afford a seat or recess for receiving a fulcrum-block 15. The body portion of said divided or double strut 13 is cast with an end flange or annular rim $a$ on its outer end, which when a part thereof is severed from the body by a saw or other tool, as shown in Figs. 4 and 7, may be bent inward by a hammer or other tool, so as to overreach the top of the fulcrum-block 15 when in working position, as shown in Fig. 4, thus securing the said block within its seat in the strut and preventing endwise displacement of the same. Fig. 7 shows the said securing flange or rim $a$ as it appears before it is bent inward, and Fig. 4 shows the same as it would appear after having been bent inward for securing the block from displacement. The body portion of the strut 13 is provided with a pair of lever-passages $a'$ and $a^2$, extending therethrough in planes which intersect each other, and are so disposed as to guide or hold the lever in its proper working position; or, otherwise stated, the said lever-passages $a'$ and $a^2$ are designed for interchangeable use in holding the lever and are so disposed that whichever one of the same may be used, as the location may require, will hold the lever at its proper working angle in respect to the vertical and the horizontal planes.

The fulcrum-block 15 is provided with a single lever-passage $b$ and with a central pin-hole or seat $b'$ for the fulcrum-pin $b^2$ at right angles to the said lever-passage $b$. When the said fulcrum-block 15 is seated in the strut or holder 13, it rests against the inner or closed end of the strut or holder and may be rotated therein so as to bring its lever-passage $b$ into registration with either of the lever-passages $a'$ or $a^2$ in the said strut or holder 13. Hence the lever 6 or 8 may be passed through the registering passages of the strut or holder 13 and the fulcrum-block 15 and be secured by means of the pin $b^2$, which will then occupy the pin-hole or seat $b'$ of the block 15 and the otherwise unoccupied lever-passage in the strut or holder 13. In the brake-riggings as ordinarily constructed and used the levers 6 and 8 must stand or are usually disposed so as to stand at an angle of about forty degrees to the vertical plane. Hence the passages $a'$ and $a^2$ in the strut or holder 13 must be so disposed as to give that result when interchangeably used for the lever; but the pin $b^2$ must work through the fulcrum-block 15 and the lever secured therein at right angles to the said lever and its passage-way $b$ in the said block. Hence provision must be made to permit the pin $b^2$ to occupy an angular position in respect to the plane through the center of the unoccupied passage-way in the holder or strut 13. This provision is made by cutting away the proper walls of the passages $a'$ and $a^2$ in the holder 13, so as to form partial seats $a^3$ and $a^4$ for the pin, as best shown in Figs. 3, 8, and 14. The countersunk seats for the pin-head are formed on the walls of the strut or holder 13 directly adjacent to the lever-passages $a'$ and $a^2$, and the said countersunk seats for the pin-head are eccentric to the center line of the lever-passage, on the walls of which they are formed. Otherwise stated, the said pin-head seats are made up of the seat-sections $a^5$ and $a^6$, and the said section $a^5$ is of greater radial depth than the section $a^6$ in order to afford the desired bearings for the pin-head and permit the pin to occupy the position shown.

The relation of the pin to the lever and of the said parts to the vertical plane are best illustrated in Figs. 3 and 14. In said Fig. 14, which is a diagram view, as hitherto noted, the positions of the lever and the pin $b^2$ as they would appear when occupying the position shown in the other views are indicated in heavy broken lines, while the positions which the same parts would take when the beam was to be applied to the inner instead of the outer pair of wheels are indicated in light dotted lines. The center lines of the lever as it would appear in the two different positions, the center line or axis of the pin as it would appear in two different positions, and the vertical plane are all indicated by continuous lines. The angular distances are marked on the curved lines at the top of the figure as measured in opposite directions from the vertical plane. The inner or smaller circle-arcs show that the lever is set forty degrees to the vertical, and the outer or larger circle-arcs indicate that the pin is set at fifty degrees to the vertical. These relations hold true in the interchangeable use.

By inspection of the drawings it will also be seen that the parts are so related as to cause the strain applied to the pin from the lever to be transmitted to the lever-holder or strut 13 through the fulcrum-block 15. Otherwise stated, the strain from the brake-lever is not taken on the pin-bearings or partial pin-bearings $a^3$ and $a^4$ in the walls of the strut or holder, but is transmitted through the block 15 against the closed or inner end of the strut. Hence the braking strain is taken by the strut or holder and the beam parts 10 and 11.

In the modification shown in Figs. 8 to 11, inclusive, the only differences over the construction of the lever-support as so far described relate to the means for holding the fulcrum-block from endwise displacement in its seat in the divided or double strut. In this modification shown in Figs. 8 to 11, inclusive, the body of the strut 13 is provided with a short key-lug $c$ near its open end, as shown in Fig. 8, and the fulcrum-block $15^a$ is provided with keyways $c'$, which are cut lengthwise thereof and open into the lever-passage $b$, as shown in Fig. 9. Hence the said fulcrum-block $15^a$ may be entered into its seat by bringing the parts into the relation shown in Fig. 10, and by then turning the block so as to bring the parts into the position shown in Fig. 11 the lug $c$ will overreach the outer end of the block and prevent endwise displacement of the same. The lug $c$ must of course be properly positioned on the strut, so as to be out of line of registration with the keyways $c'$ in the block when the block is in position to bring its lever-passage $b$ into registration with either of the lever-passages $a'$ or $a^2$ in the strut or holder 13.

In the modification shown in Figs. 12 and 13 the differences are simply such as are incidental to the use of a single or undivided strut in the brake-beam. In order to adapt the single or undivided strut $13^a$ to serve as my lever-support, the body of said strut is cored out from the inner end outward, so as to form a seat for the fulcrum-block, and the saddle $f f'$ is made in a separate piece, which is adapted to be applied to the strut after the block is in position, as shown in Figs. 12 and 13. The body of the strut $13^a$ is provided with a cross-partition $f^2$, or is solid at that point, so as to prevent the endwise displacement of the block when adjusting the same for shifting the levers, as required for the interchangeable use of the beam. The saddle $f f'$ serves to hold the block in the strut when the strut is in proper working position in respect to the other parts of the beam, as shown in Fig. 12. The strut-body and the saddle $f$ have screw-threaded engagement, and hence the strain from the lever is transmitted through the fulcrum-block to the strut.

In other respects than those noted the construction and action of the parts shown in Figs. 12 and 13 would be the same as in the preferred form already described.

In Fig. 15 I have illustrated a modification of the lever-support as it might be constructed for use on an ordinary wooden brake-beam. In this modification the numeral 16 represents the brake-beam, 17 the holder, and 18 nutted bolts which are used to secure the lever-support to the brake-beam. The fulcrum-block is or may be identical with the form shown in the other views already considered, and is marked, as before, with the numeral 15. The lever-holder 17 in this modification is in the form of a flanged casting, which is cored out to form a seat for the block 15 from its outer or flanged end inward. Otherwise stated, the said holder 17 is cup-shaped and is provided with a flanged rim. The block 15 is placed in the holder 17 before the same is applied to the beam. The holder is then bolted to the beam and is ready for use. The holder is provided with lever-passages, pin-seat bearings, &c., which correspond in all respects to the corresponding parts shown when the struts are employed as the holder, as illustrated in the principal views, and are marked with the same notations. A holder in substantially this form illustrated in Fig. 15 might also be used in some forms of metallic beams, either as shown or with slight modifications thereof.

In the views marked Fig. 16 and 17 I have illustrated a modification which is simply the reverse or substantially the reverse of the form of lever-support illustrated in the principal views. In said views, Figs. 16 and 17, a single or undivided strut 19 is shown as properly modified or constructed to serve as the fixed or holder member of my lever-support. The body of the said strut 19 is therefore provided with two lever-passages $h$ in proper position relative to each other for interchangeable use in holding the levers 6 or 8 in proper working position. The fulcrum-block 20 is then made in the form of a sleeve adapted to fit over the body of the strut or holder 19 and to turn thereon. The fulcrum-block 20 is provided with the single lever-passage $h'$ for registration with either of the lever-passages $h$ in the strut or holder 19. It also has a pin-hole $h^2$ at right angles to its lever-passage $h'$. The walls of the lever-passages $h$ in the holder are properly recessed to form partial bearings $h^3$ and $h^4$ for the pin $h^2$, so as to permit the same to occupy the angular position required in respect to the center lines through said lever-passages $h$ in the holder. The saddle $h^5$ is provided with lugs $h^6$, adapted to engage with lugways $h^7$ on the inner end of the strut for securing the same thereto when the said lugs are entered into the lugways and the saddle is given a partial turn, so as to bring the same into proper working position in respect to the truss-rod. The saddle-flange bears against the inner end of the fulcrum-block 20 when the parts are in working position, thereby causing the strain from the lever to be transmitted from the pin through the block 20 to the saddle and the strut, so as to cause the strut and the beam to take the braking strain, as was the case with the divided or double strut hitherto described.

These several modifications in the forms of my lever-support have been shown for the purpose of making it clear that the principle of the invention is, in the broad point of view, capable of a wide diversity of construction.

Analysis will show that in all the forms the lever-support involves a fixed holder containing two or more lever-passages for interchangeable use and a fulcrum-block which is seated for rotary movement in respect to the holder or fixed part and is provided with a lever-passage that may be brought into registration with any desired one of the lever-passages in the holder. In all cases also the walls of the lever-passages in the holder or fixed part are recessed or cut away to form partial bearings for the fulcrum-pin, so as to permit the said pin to occupy the position required, and in all instances the braking strain from the lever is transferred through the fulcrum-block to the holder. As applied to the brake-beam, therefore, the strain is distributed to the best possible advantage.

Although the lever-support herein disclosed may, in the broad point of view, be capable of use in other applications, the same was especially designed, as hitherto noted, for use on or as a part of brake-beams, in order to render the same capable of interchangeable use in any desired position on the car.

The convenience and value of an interchangeable brake-beam for railway-cars is well understood. Thereby only one style or pattern of brake-beam is required, repairs and substitutions are greatly facilitated, and a much smaller number of beams need be carried in stock for repairs or supplies. Hence a large economy is effected.

It is obvious that my construction for rendering a brake-beam interchangeable is extremely simple, reliable, and durable.

What I claim, and desire to secure by Letters Patent of the United States, is as follows:

1. A lever-support comprising a fixed holder having two or more lever-passages and a fulcrum-block seated within said holder for rotary movement in respect thereto and having a lever-passage which may be brought into registration with any one of said lever-passages in the holder, with said parts so related that the strain applied by the lever will be transferred to the holder, through the fulcrum-block, substantially as described.

2. A lever-support comprising a fixed holder having two or more lever-passages, a fulcrum-block seated within said holder for rotary movement in respect thereto and having a lever-passage registrable with any of said lever-passages in said holder, and a fulcrum-pin passing through said block at right angles to the lever-passage thereof, with said parts so related that the strain from the lever will be transmitted by the block to the holder, substantially as described.

3. In a lever-support, the combination with a fixed holder having two or more lever-passages, of a rotary fulcrum-block concentric with said holder, having a lever-passage which may be brought into registration with any one of said passages in the holder, a fulcrum-pin, a hole for said pin in said block, at right angles to the lever-passage therein, and partial seats for said pin in the walls of said lever-passages in the holder, so arranged as to permit the pin to take an angular position in respect to a plane through the center of the lever-passage in the holder occupied thereby, substantially as described.

4. In a lever-support, the combination with a fixed holder having two or more lever-passages, of a rotary fulcrum-block concentric with said holder and having a single lever-passage which may be brought into registration with either passages of said holder, a fulcrum-pin, a pin-hole for the same in said block, at right angles to the lever-passage thereof, partial seats or bearing-surfaces in the walls of the lever-passages in said holder, for permitting the pin to take an angular position in respect to the center line or plane of the lever-passage occupied thereby, and a seat for the pin-head partially formed on the two walls of said passages, so as to be eccentric to the center line thereof, substantially as and for the purposes set forth.

5. In a lever-support, the combination with a fixed holder having two or more lever-passages, of a rotary fulcrum-block, within said holder and carried thereby, having a lever-passage which may be brought into registration with any desired passage in said holder, and means for preventing the endwise displacement of said block in respect to said holder, substantially as and for the purposes set forth.

6. The combination with a brake-beam, of a fixed lever-holder having two or more lever-passages, a rotary fulcrum-block, carried within said holder, having a lever-passage registrable with any lever-passage in the holder, and a pin passing through said block and lever, with said parts so related that the strain from the lever will be transmitted by the block to the holder, substantially as described.

7. In a brake-beam, the combination with the beam-body and the truss-rod, of a strut having two or more lever-passages, at the proper angles for interchangeable use in holding the brake-levers, a rotary fulcrum-block carried within said strut and having a lever-passage which may be brought into registration with either of said passages in the strut, whereby the beam is rendered interchangeable, substantially as described.

8. In a brake-beam, the combination with the beam-body and the truss-rod, of a strut having a pair of lever-passages, at the proper angles for interchangeable use in supporting the brake-levers at the proper working angles, of a rotary fulcrum-block carried within said strut having a lever-passage registrable with either of said passages in the strut, with said parts so related that the strain from the lever will be transmitted through said block to said strut and the beam, substantially as described.

9. In a brake-beam, the combination with the beam-body and the truss-rod, of a strut having a pair of lever-passages properly disposed for supporting the brake-levers at the required working angles, of a fulcrum-block carried by said strut having a lever-passage which may be brought into registration with either of said passages in the strut, a pin-hole in said block, at right angles to the lever-passage thereof, a pin connecting the lever to said block and having its ends extending through the otherwise unoccupied lever-passage in the strut, and partial seats for said pin in the walls of the lever-passages in said strut, so arranged that the pin may pass through the holder while the lever stands at the required angle to the vertical plane, substantially as described.

10. The combination with a divided or two-part brake-beam strut, formed with a fulcrum-block seat having two or more lever-passages, of a fulcrum-block rotatively seated in the said seat and provided with a lever-passage which, by rotary movement of said block, may be alined with either of the said lever-passages in said seat, substantially as described.

11. The combination with a divided or double brake-beam strut having its body portion cored out, from its outer end, inward, to receive a fulcrum-block, of a fulcrum-block seated in said strut, and an annular rim or flange formed on the outer end wall of the strut, adapted, when partially separated from the strut, to be bent inward so as to overreach the end of the block and hold the same from endwise displacement, substantially as described.

12. In a brake-beam, the combination with the beam-body 10 and the truss-rod 11, of the double or divided strut 13, cored out as described, having the lever-passages $a'$ and $a^2$, the fulcrum-block 15 seated in said strut having the lever-passage $b$ and the pin-hole $b'$, as described, the pin $b^2$, and the partial bearing-surfaces $a^3$ and $a^4$ for the shank of the pin and the partial bearing-surfaces $a^5$ and $a^6$ for the head of the pin on the walls of said lever-passages in said strut, all substantially as and for the purposes set forth.

In testimony whereof I affix my signature in presence of two witnesses.

HENRY H. VAUGHAN.

Witnesses:
JAS. F. WILLIAMSON,
F. D. MERCHANT.